Nov. 13, 1945. E. H. HAUG 2,388,845
ELECTRIC CONTROL SYSTEM
Filed Sept. 9, 1943
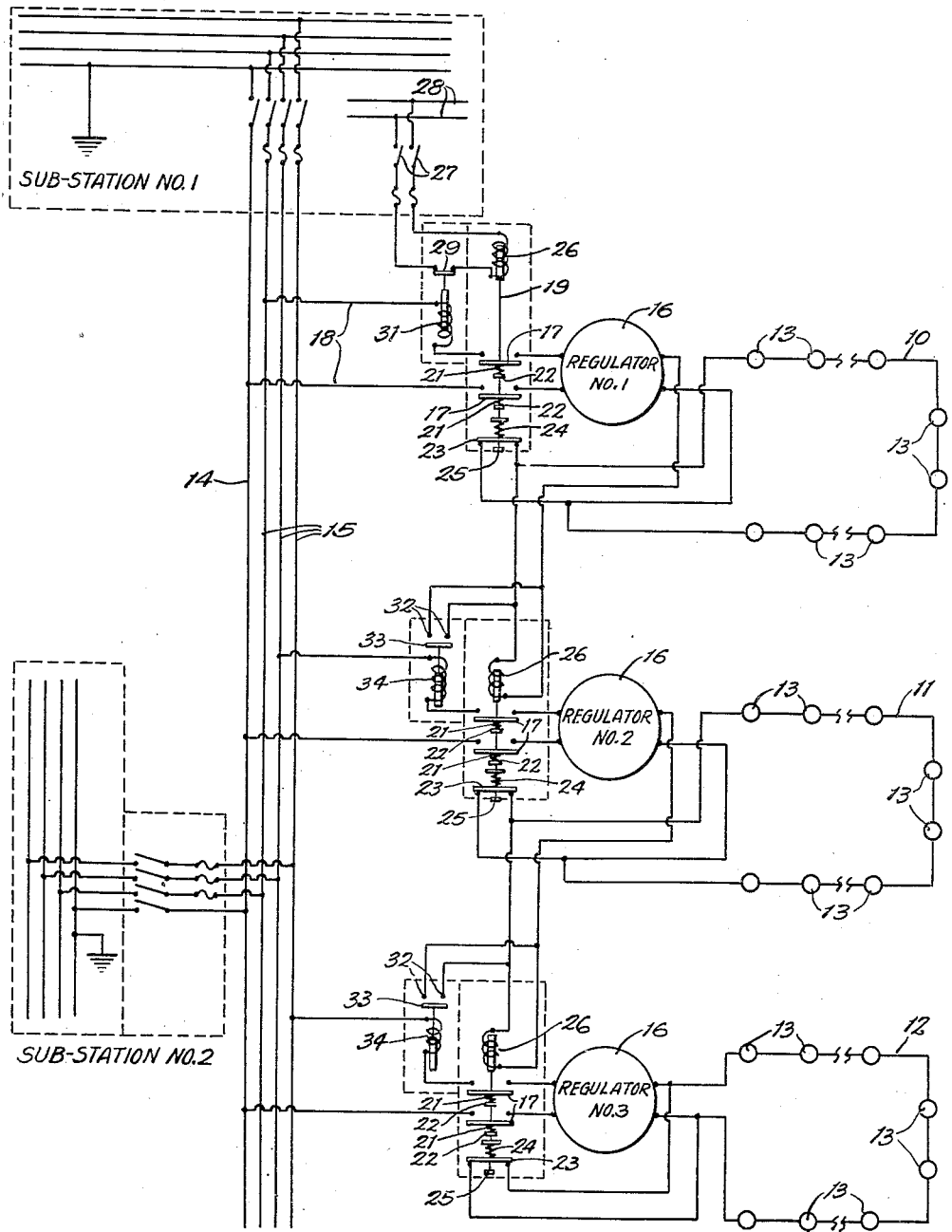
Inventor:
Eugene H. Haug,
By Dawson, Ooms & Booth,
Attorneys.

UNITED STATES PATENT OFFICE 2,388,845

ELECTRIC CONTROL SYSTEM

Eugene H. Haug, Chicago, Ill., assignor to La Salle National Bank, Chicago, Ill., as trustee Application September 9, 1943, Serial No. 501,625

3 Claims. (Cl. 171—97)

This invention relates to electric control system and more particularly to a system for successively connecting a plurality of load circuits to a supply source and for protecting the load circuits.

One of the objects of the invention is to provide an electric control system in which a plurality of load circuits are connected successively to a supply source and the connection of each load circuit is controlled by current flow in the next preceding load circuit.

Another object of the invention is to provide an electric control system in which a plurality of constant current regulators are employed to connect load circuits to a source and the connection of each regulator to the source is controlled by a coil in series in the preceding load circuit.

Still another object of the invention is to provide an electric control system in which a main control switch on the supply side of a constant current regulator is controlled in response to the current supply to the regulator.

A further object of the invention is to provide an electric control system in which the supply of current to a constant current regulator is controlled by an electrically operated switch and the switch operating coil is shunted in response to the current supplied to the regulator.

A still further object of the invention is to provide an electric control system in which a constant current regulator is controlled by a switch having main contacts and an auxiliary contact connected to short circuit the regulator output before the main contacts are open and to maintain the short circuit until after the main contacts are closed.

The above and other objects and advantages will be more readily apparent from the following description when read in connection with the accompanying drawing, in which—

The single figure is a circuit diagram of an electric control system embodying the invention.

The system as illustrated is adapted to control the connection of a plurality of load circuits 10, 11 and 12, each including electric lamps 13 in series to a source of supply. The source as illustrated, comprises a neutral or ground wire 14 and three circuit wires 15 supplied with current from one or more sub-stations. As indicated, two sub-stations may be provided connected to the wires 14 and 15 to supply alternating current thereto.

Each of the load circuits is supplied through a constant current regulator 16 of any desired type, such, for example, as that more particularly described and claimed in my copending application, Serial No. 469,974 filed December 24, 1942. The regulators are designated as No. 1, No. 2 and No. 3, corresponding to the first, second and third load circuits 10, 11 and 12.

The regulators are connected to the supply source through control switches and since the control switch for each regulator is substantially identical, only one will be described in detail. As shown, each control switch includes a pair of main contacts 17 to connect the input side of the regulator to the source through wires 18. The contacts 17 are loosely mounted on a movable actuator plunger 19 and may be moved with the plunger through springs 21 engaging fixed collars 22 on the plunger. A third or auxiliary contact 23 is loosely mounted on the plunger and is urged in one direction thereon by a spring 24, a stop 25 on the plunger limiting movement of the contact 23.

The plunger may occupy an off-position as shown, in which the contact 23 is closed and the contacts 17 are opened. To move the plunger to its on-position, an operating coil 26 is provided adapted when energized, to raise the plunger to open the contact 23 and close the contacts 17. With the contacts arranged as shown, the spring 24 will hold the contact 23 closed until the contacts 17 have closed and further movement of the plunger will thereafter open the contact 23. When the coil 26 is de-energized, the contact 23 will first close before the contacts 17 are opened.

The operating coil 26 for the first switch is adapted to be controlled through a switch 27 which may conveniently be located in one of the sub-stations and which supplies the coil 26 with current from a separate control circuit 28. A normally closed switch 29 is arranged in series with the coil 26 so that when the switch 29 is open, the coil 26 cannot be energized regardless of the position of switch 27. The switch 29 is controlled by a coil 31 in series with one of the lines 18 so that when the current supply to the regulator exceeds a predetermined value, the switch 29 will be opened to de-energize the coil 26 and interrupt the supply of power to the regulator.

The output side of the first regulator is connected to its load circuit 10 through the operating coil 26 of the second switch. The switch 23 is further connected in shunt with the load circuit so that when the switch 23 is closed the output circuit of the regulator will be shorted. The switch 23 of the second regulator is similarly connected in shunt with its output circuit and the coil 26 of the third switch is in series with the second load circuit 11.

In each of the regulators following the first one, a pair of contacts 32 are provided connected in shunt with the operating coil 26 and adapted to be bridged by a contact 33 controlled by a coil 34 in the supply circuit to the regulator. In the event the current supplied to the regulator exceeds a predetermined value, the contact 33 will be raised to connect the contacts 32 thereby shunting the operating coil 26 so that the main switch will open.

In operation with the contact 29 closed when the switch 27 is closed, the coil 26 will be energized to raise the plunger 19 of the first switch. This will first first close the contacts 17, while the contact 23 is still closed, so that the regulator will draw a very low current from the supply source and arcing of the switch contacts will be avoided. Thereafter the contact 23 will be open causing the current to flow through the load circuit 10 and through the operating coil 26 of the second switch. This switch will now function in substantially the same manner as the first switch to supply current to the load circuit 11 and the operating coil 26 of the third switch. Thus the several load circuits are connected to the source successively so that an excessive load is not thrown on the source at one time.

In the event of interruption in one of the load circuits as, for example, in the circuit 12, the third regulator will tend to increase the voltage at its output side in an effort to maintain current flow through the load circuit. This will cause an increase of the current supply to the regulator and when this current exceeds the amount for which the coil 34 is adjusted, the contact 33 will bridge the contacts 32 shorting out the operating coil 26. As soon as this occurs the operating coil will allow the plunger to move to switch opening position, first closing the contact 23 and thereafter opening the contacts 17. Closing of the contact 23 re-establishes current flow and since a dead short circuit is produced, reduces the voltage in the regulator output circuit and correspondingly reduces the current in the supply circuit to the regulator. Thus, the contacts 17 are always open when a minimum of current is flowing therethrough so that burning of the contacts is prevented.

It will be noted that interruption of the load circuit 12 disconnects this circuit without affecting operation of the first and second load circuits. Similarly if a break should occur in the second load circuit 11, its switch would be open to interrupt the supply to its regulator. In this case, it will be noted that interruption of the second load circuit will de-energize the operating coil 26 of the third switch so that the third and any succeeding load circuits will be disconnected.

In the event of an interruption in the first load circuit 10, increase of current supply to the regulator will energize the coil 31 to open the switch contact 29 and de-energize the switch operating coil 26. It will be understood, of course, that any interruption in the first load circuit will cause all of the load circuits to be disconnected from the supply source.

While one embodiment of the invention has been shown and described herein in detail, it will be understood that this is illustrative only and is not intended as a definition of the scope of the invention, reference being had for this purpose to the appended claims.

What is claimed is:

1. An electric control system for connecting a plurality of load circuits to a source of supply comprising constant current regulators connected to the load circuits respectively, a switch controlling connection of the first constant current regulator to the source, means for controlling the switch, a second switch controlling connection of the second regulator to the source, an operating coil for the second switch connected in series in the first load circuit whereby when current is flowing through the first load circuit the second switch will be closed, a shunt switch connected across the operating coil, and means responsive to the current flow to the second regulator to close the shunt switch when the current exceeds a predetermined amount.

2. An electric control system for connecting a plurality of load circuits to a source of supply comprising constant current regulators connected to the load circuits respectively, a switch controlling connection of the first constant current regulator to the source, means for controlling the switch, a second switch controlling connection of the second regulator to the source, an operating coil for the second switch connected in series in the first load circuit whereby when current is flowing through the first load circuit the second switch will be closed, a shunt switch connected across the operating coil, and a coil in series in the supply circuit to the second regulator to close the shunt switch when the current exceeds a predetermined value.

3. An electric control system for connecting a plurality of load circuits to a source of supply comprising constant current regulators connected to the load circuits respectively, a switch controlling connection of the first constant current regulator to the source, means for controlling the switch, a second switch controlling connection of the second regulator to the source, and an operating coil for the second switch connected in series in the first load circuit whereby when current is flowing through the first load circuit the second switch will be closed and each of said switches including an actuating member, a pair of main contacts controlled thereby for controlling the supply circuits to the regulators, and a third set of contacts connected in shunt with the respective load circuits so constructed and arranged as to open after the main contacts are closed and to close before the main contacts are opened upon movement of the actuator member.

EUGENE H. HAUG.